US012768504B2

(12) United States Patent
Khan et al.

(10) Patent No.: US 12,768,504 B2
(45) Date of Patent: Oct. 20, 2026

(54) METHOD AND SYSTEM FOR CORROSION INTEGRITY ASSESSMENT FOR NON-SCRAPABLE GAS FLOWLINES USING ARTIFICIAL INTELLIGENCE

(71) Applicant: SAUDI ARABIAN OIL COMPANY, Dhahran (SA)

(72) Inventors: Muhammad Sohaib Khan, Udhailiyah (SA); Koppuravuri Balakoteswara Rao, Al Khobar (SA); Mohammed S. Alqahtani, Udhailiyah (SA); Ali A. Alharbi, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 621 days.

(21) Appl. No.: 18/314,480

(22) Filed: May 9, 2023

(65) Prior Publication Data

US 2024/0377037 A1 Nov. 14, 2024

(51) Int. Cl.
*F17D 1/20* (2006.01)
*F17D 1/04* (2006.01)

(52) U.S. Cl.
CPC *F17D 1/20* (2013.01); *F17D 1/04* (2013.01)

(58) Field of Classification Search
None
See application file for complete search history.

(56) References Cited

U.S. PATENT DOCUMENTS

| | | | |
|---|---|---|---|
| 7,263,465 B2 | 8/2007 | Turley et al. | |
| 8,510,147 B2 | 8/2013 | Mitra et al. | |
| 8,903,558 B2 | 12/2014 | Jarrell et al. | |
| 2003/0171879 A1* | 9/2003 | Pittalwala | F17D 5/00 702/34 |

(Continued)

FOREIGN PATENT DOCUMENTS

| | | | |
|---|---|---|---|
| CN | 112580182 A | * | 3/2021 |
| JP | 2022131956 A | * | 9/2022 |

OTHER PUBLICATIONS

Machine translation of CN112580182A (Year: 2019).*

*Primary Examiner* — Matthew G Marini
(74) *Attorney, Agent, or Firm* — Osha Bergman Watanabe & Burton LLP

(57) ABSTRACT

Methods and systems for a flowline corrosion manager is disclosed. The method includes obtaining gas flowline data regarding a first pipe component in a gas production network, determining internal assessment data for the first pipe component, and determining external assessment data for the first pipe component. Gas flowline data includes operating sensor data, cathodic protection status updates, and corrosion inhibitor compliance data over the gas production network. Internal corrosion assessment data include an internal report identifying internal corrosion presence. External corrosion assessment data includes an external report identifying external corrosion presence. The method further includes determining whether the internal corrosion assessment data and the external corrosion assessment data satisfy (Continued)

an integrity criterion for the first pipe component and transmitting a command that implements a remediation operation for the first pipe component. Remediation operations include a procedure that adjusts the gas production network to mitigate internal corrosion and minimize external corrosion.

13 Claims, 7 Drawing Sheets

(56) References Cited

U.S. PATENT DOCUMENTS

2010/0185401 A1* 7/2010 Hernandez ................ F17D 5/00
702/34
2016/0362956 A1* 12/2016 Older .................... E21B 43/013

* cited by examiner

METHOD AND SYSTEM FOR CORROSION INTEGRITY ASSESSMENT FOR NON-SCRAPABLE GAS FLOWLINES USING ARTIFICIAL INTELLIGENCE

BACKGROUND

Natural gas wells may include wells that do not produce oil but only raw natural gas or condensate wells that produce both gas and natural gas condensate (i.e., wet gas). For many condensate wells, a gas-liquid mixture at the well may pass through a field separator to remove condensate and water. The natural gas liquids separated at this stage may be transported to a gas plant accordingly. Other times, a mixed stream of gas, water, and/or oil may be transported to a gas plant for further processing. To transport gas between gas well and gas plants, various gas flowlines are used. These gas flowlines may include multiple pipe components that may experience corrosion over time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for a flowline corrosion manager, including: obtaining, by a computer processor, gas flowline data regarding a first pipe component in a gas production network, wherein gas flowline data comprises operating sensor data, cathodic protection status updates, and corrosion inhibitor compliance data over the gas production network; determining, by the computer processor and based on the gas flowline data, internal corrosion assessment data for the first pipe component, wherein internal corrosion assessment data comprises an internal report identifying internal corrosion presence in the gas production network; determining, by the computer processor and based on the gas flowline data, external corrosion assessment data for the first pipe component, wherein external corrosion assessment data comprises an external report identifying external corrosion presence in the gas production network; determining, by the computer processor, whether the internal corrosion assessment data and the external corrosion assessment data satisfy an integrity criterion for the first pipe component; and transmitting, by the computer processor in response to the internal corrosion assessment data and the external corrosion assessment data failing to satisfy the integrity criterion, a command that implements a remediation operation for the first pipe component, wherein the remediation operation comprises a procedure that adjusts the gas production network to mitigate internal corrosion and minimize external corrosion.

In one aspect, embodiments relate to a system, including: a first plurality of gas wells; a gathering system coupled to the first plurality of gas wells, the gathering system comprising a plurality of remote headers that are configured for controlling streams from the first plurality of gas wells; a gas plant coupled to the gathering system; and a flowline corrosion manager comprising a computer processor and coupled to the gas plant and the gathering system. The flowline corrosion manager is configured to perform a method comprising: obtaining first gas well data regarding the first plurality of gas wells; obtaining gas flowline data regarding a first pipe component in a gas production network comprising the gathering system, the gas plant, and the first plurality of gas wells, wherein gas flowline data comprises operating sensor data, cathodic protection status updates, and corrosion inhibitor compliance data over the gas production network; determining, based on the gas flowline data, internal corrosion assessment data for the first pipe component, wherein internal corrosion assessment data comprises an internal report identifying internal corrosion presence in the gas production network; determining, based on the gas flowline data, external corrosion assessment data for the first pipe component, wherein external corrosion assessment data comprises an external report identifying external corrosion presence in the gas production network; determining whether the internal corrosion assessment data and the external corrosion assessment data satisfy an integrity criterion for the first pipe component; and transmitting, in response to the internal corrosion assessment data and the external corrosion assessment data failing to satisfy the integrity criterion, a command that implements a remediation operation for the first pipe component, wherein the remediation operation comprises a procedure that adjusts the gas production network to mitigate internal corrosion and minimize external corrosion.

In one aspect, embodiments relate to a non-transitory computer-readable medium comprising computer-executable instructions stored thereon that, when executed on a processor, cause the processor to perform: obtaining gas flowline data regarding a first pipe component in a gas production network, wherein gas flowline data comprises operating sensor data, cathodic protection status updates, and corrosion inhibitor compliance data over the gas production network; determining, based on the gas flowline data, internal corrosion assessment data for the first pipe component, wherein internal corrosion assessment data comprises an internal report identifying internal corrosion presence in the gas production network; determining, based on the gas flowline data, external corrosion assessment data for the first pipe component, wherein external corrosion assessment data comprises an external report identifying external corrosion presence in the gas production network; determining whether the internal corrosion assessment data and the external corrosion assessment data satisfy an integrity criterion for the first pipe component; and transmitting, in response to the internal corrosion assessment data and the external corrosion assessment data failing to satisfy the integrity criterion, a command that implements a remediation operation for the first pipe component, wherein the remediation operation comprises a procedure that adjusts the gas production network to mitigate internal corrosion and minimize external corrosion.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
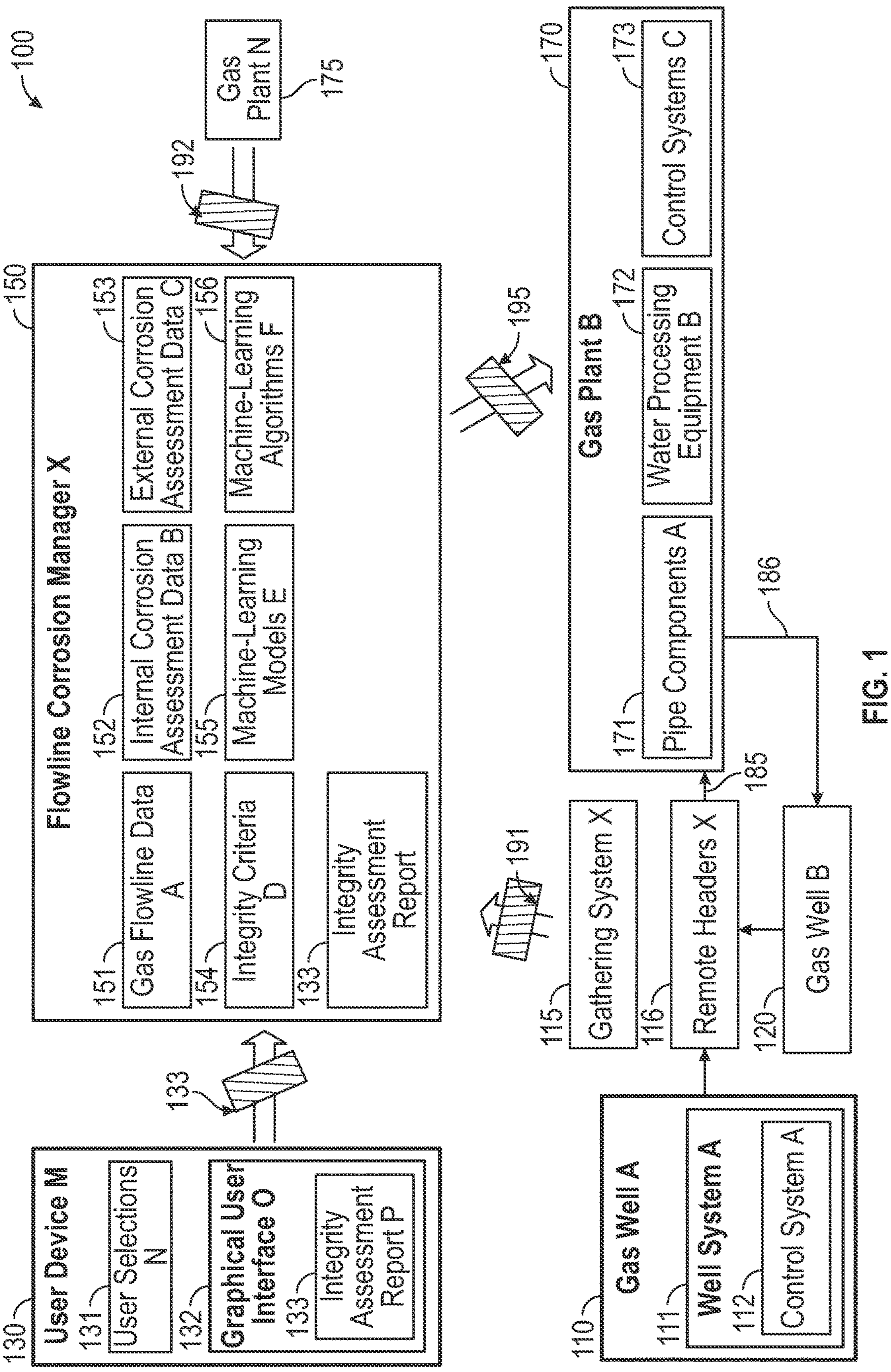
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing integrity assessments of various pipe components in gas flowlines using artificial intelligence technology. In some embodiments, for example, various pipe components of non-scrapable mitigated gas flowlines are pro-actively evaluated for integrity while on-stream, i.e., being used in gas production and/or gas distribution. More specifically, some embodiments determine internal corrosion and external corrosion of a particular pipe component using gas flowline data, such as operational parameters of gas plants, chemical compositions of produced gas, compliance of any corrosion inhibitor injections, and cathodic protection data. Using the internal corrosion data and external corrosion data, an integrity assessment may be performed on the corresponding pipe component. This integrity assessment may be used to determine whether to perform a remediation operation on the pipe component, as well as which type of remediation operation to perform.

Furthermore, some embodiments allow for expedited integrity assessments of a large number of gas flowlines while on-stream to prevent loss of containment and improve system reliability. In particular, gas producing operations involve huge numbers of gas flowlines scattered over a large geographical area. As such, internal corrosion and external corrosion are primary issues that can result in gas flowline failures, especially when the flowlines are non-scrapable. Once the flowlines are in service, for example, appropriate remediation is put in place such as corrosion inhibitor injections to mitigate internal corrosion. Likewise, cathodic protection may be provided to pipe components to minimize external corrosion as well. However, because many operational factors may impact various corrosion threats despite mitigation procedures, pipeline integrity evaluation has been typically based on identifying internal and external corrosion threats. To perform these integrity evaluations, gas equipment may need to be taken offline and out of service to facilitate physical inspections and cause production loss and health/safety/environment (HSE) issues. In contrast, some embodiments overcome these challenges by providing artificial intelligence decision-making to determine whether corrosion threats are or will occur to a particular pipe component, as well as automated remediation of the threats.

Turning to FIG. 1, FIG. 1 shows a schematic diagram in accordance with one or more embodiments. As shown in FIG. 1, a gas production network (e.g., gas production network A (100)) may include various gas wells (e.g., gas well A (110), gas well B (120)), various gas plants (e.g., gas plant B (170), gas plant N (175)), and various user devices (e.g., user device M (130)), various control systems (e.g., control system A (112), control systems C (173)), various network elements (not shown), and/or a flowline corrosion manager (e.g., flowline corrosion manager X (150)). In one or more embodiments, flowline corrosion manager X (150) may be a gas plant server. In some embodiments, various types of gas flowline data (e.g., gas flowline data X (191), gas flowline data Y (192)) are collected over the gas production network. Likewise, the gas production network may also determine internal corrosion assessment data (e.g., internal corrosion assessment data B (152)) and/or external corrosion assessment data (e.g., external corrosion assessment data C (153)) regarding one or more pipe components providing gas flowlines throughout the gas production network.

Furthermore, a gas well (e.g., gas well A (110) or gas well B (120)) may include a well system (e.g., well system A (111)) located in a well environment that includes a hydrocarbon reservoir ("reservoir") located in a subsurface hydrocarbon-bearing formation. The hydrocarbon-bearing formation may include a porous or fractured rock formation that resides underground, beneath the earth's surface ("surface"). In the case of the well system being a hydrocarbon well, the reservoir may include a portion of the hydrocarbon-bearing formation. The hydrocarbon-bearing formation and the reservoir may include different layers of rock having varying characteristics, such as varying degrees of permeability, porosity, and resistivity. In the case of the well system being operated as a production well, the well system may facilitate the extraction of hydrocarbons (or "production") from the reservoir. In some embodiments, the well system includes a wellbore, a well sub-surface system, a well surface system, and a well control system. The wellbore may include a bored hole that extends from the surface into a target zone of the hydrocarbon-bearing formation, such as the reservoir. The wellbore may facilitate the circulation of drilling fluids during drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations). A control system (e.g., control system A (112)) in a well system may control various operations of the well system, such as well production operations, well completion operations, well maintenance operations, and reservoir monitoring, assessment and development operations. In some embodiments, the control system includes a computer system that is the same as or similar to that of computer system (502) described below in FIG. 5 and the accompanying description.

In some embodiments, one or more gas wells are coupled to a gathering system (e.g., gathering system X (115)). A gathering system (also referred to as a collecting system or gathering facility) may include various hardware arrangements and pipe components that connect gas flowlines from several gas wells into a single gathering line. For example, a gathering system may include flowline networks, headers, pumping facilities, separators, emulsion treaters, compressors, dehydrators, tanks, valves, regulators, and/or associated equipment. In particular, a remote header (e.g., remote headers X (116)) may have production valves and testing valves to control a mixed stream for a flowline of a respective gas well. Thus, a gathering system may direct various hydrocarbon fluids to a processing or testing facility, such as a gas plant. In some embodiments, a gathering system manages individual fluid ratios (e.g., a particular gas-to-water ratio or condensate-to-gas ratio) as well as supply rates of oil, gas, and water. For example, a gathering system may assign a particular production value or ratio value to a particular gas well by opening and closing selected valves among the remote headers and using individual metering equipment or separators. Furthermore, a gathering system may be a radial system or a trunk line system. A radial system may bring various flowlines to a single central header. In contrast, a trunk-line system may use several remote headers to collect oil and gas from fields that cover a large geographic area. Once collected, the gathering system may transport and control the flow of oil or gas to a storage facility, a gas processing plant, or a shipping point.

Keeping with FIG. 1, gas may be transported from one or more gas wells (e.g., gas well A (110)) to one or more gas plants (e.g., gas plant B (170)), such as through one or more mixed fluid streams (e.g., mix fluid stream (185)). More specifically, a gas plant may refer to various types of industrial plants such as a gas processing plant, a gas cycling plant, or a compressor plant. A gas processing plant (also referred to as a natural gas processing plant) may be a facility that processes natural gas to recover natural gas liquids (e.g., condensate, natural gasoline, and liquefied petroleum gas) and sometimes other substances such as sulfur. A gas cycling plant may refer to an oilfield installation coupled to a gas-condensate reservoir. In particular, a gas cycling plant may extract various liquids from natural gas. Consequently, the remaining dry gas may be compressed prior to returning to a producing formation, e.g., to maintain reservoir pressure. Moreover, various components of natural gas may be classified according to their vapor pressures, such as low pressure liquid (i.e., condensate), intermediate pressure liquid (i.e., natural gasoline), and high pressure liquid (i.e., liquefied petroleum gas). Examples of natural gas liquids include propane, butane, pentane, hexane, and heptane. With respect to compressor plants, a compressor plant may be a facility that includes multiple compressors, auxiliary treatment equipment, and pipeline installations for pumping natural gas over long distances. A compressor station may also repressurize gas in large gas pipelines or to link offshore gas fields to their final terminals.

Keeping with gas plants, a gas plant may include water processing equipment (e.g., water processing equipment B (172)) that includes hardware and/or software for extracting, treating, and/or disposing of water associated with gas processing. More specifically, a gas plant may extract produced water (e.g., produced water (186)) during the separation of oil or gas from a mixed fluid stream (e.g., mixed fluid stream (185)) acquired from a gas well. This produced water may be a kind of brackish and saline water brought to the surface from underground formations. In particular, oil and gas reservoirs may have water in addition to hydrocarbons in various zones underneath the hydrocarbons, and even in the same zone as the oil and gas. However, most produced water is of very poor quality and may include high levels of natural salts and minerals that have dissociated from geological formations in the target reservoir. Likewise, produced water may also acquire dissolved constituents from fracturing fluids (e.g., substances added to the fracturing fluid to help prevent pipe corrosion, minimize friction, and aid the fracking process). However, through various water treatments, produced water may be reused in one or more gas wells, e.g., through waterflooding where produced water is injected into the reservoirs. By injecting produced water into an injection well, the injected water may force oil and gas to one or more production wells.

Keeping with produced water, a gas plant may use various treatment technologies in order to reuse or dispose of produced water, such as conventional treatments and advanced treatments. For example, conventional treatments may include flocculation, coagulation, sedimentation, filtration, and lime softening water treatment processes. Thus, conventional treatment processes may include functionality for removing suspended solids, oil and grease, hardness compounds, and other insoluble water components. With advanced treatment technologies, water processing equipment may include functionality for performing reverse osmosis membranes, thermal distillation, evaporation and/or crystallization processes. These advanced treatment technologies may treat dissolved solids, such as chlorides, salts, barium, strontium and sometimes dissolved radionuclides. In some embodiments, produced water is sent to a wastewater treatment plant that is equipped to remove barium and strontium, e.g., using sulfate precipitation. Outside of treatments for reusing produced water, water processing equipment may dispose of produced water using various water management options. For example, produced water may be disposed in salt water wells. Likewise, produced water may also be eliminated through a deep well injection.

In some embodiments, a gas plant may include one or more pipe components (e.g., pipe components A (171)), one or more storage facilities, and one or more control systems (e.g., control systems C (173)). For example, different forms of gas may be stored in various storage facilities that include surface containers as well as various underground reservoirs, such as depleted gas reservoirs, aquifer reservoirs and salt cavern reservoirs. With respect to control systems, a control system may include hardware and/or software that monitors and/or operates equipment, such as at a gas well or in a gas plant. Examples of control systems may include one or more of the following: an emergency shut down (ESD) system, a safety control system, a video management system (VMS), process analyzers, other industrial systems, etc. In particular, a control system may include a programmable logic controller that may control valve states, fluid levels, pipe pressures, warning alarms, pressure releases and/or various hardware components for implementing a gas flowline. Thus, a programmable logic controller may be a ruggedized computer system with functionality to withstand vibrations, extreme temperatures, wet conditions, and/or dusty conditions, such as those around a gas plant, gas well, and/or a gathering system.

With respect to distributed control systems, a distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, a control system may be coupled to facility equipment. Facility equipment may include various machinery such as one or more hardware components, such as pipe components, that may be monitored using one or more sensors. Examples of hardware components coupled to a control system may include crude oil preheaters, heat exchangers, pumps, valves, compressors, loading racks, and storage tanks among various other types of hardware components. Hardware components may also include various network elements or control elements for implementing control systems, such as switches, routers, hubs, PLCs, remote terminal units, user equipment, or any other technical components for performing specialized processes. Examples of sensors may include pressure sensors, flow rate sensors, temperature sensors, torque sensors, rotary switches, weight sensors, position sensors, microswitches, hydrophones, accelerometers, etc. A flowline corrosion manager, user devices, and network elements may be computer systems similar to the computer system (502) described in FIG. 5 and the accompanying description.

In some embodiments, a gas production network includes a flowline corrosion manager (e.g., flowline corrosion manager X (150)) that includes hardware and/or software for collecting data in real-time from various gas wells, gas plants, sensors coupled to hardware equipment and pipe components, user devices, and other systems in the gas production network. For example, a flowline corrosion manager may be one or more plant servers with functionality for obtaining data throughout the gas production network, such as gas flowline data (e.g., gas flowline data X (191)). For example, gas flowline data may include operating upstream and downstream sensor data for various pipe components (e.g., pressure data, temperature measurements, and gas flow rates), cathodic protection status updates, and corrosion inhibitor compliance status reports from various pipeline information (PI) systems, such as control systems located throughout the gas production network. Gas flowline data may also include gas chemical composition data, such as condensate-gas ratio (CGR) data, and water sampling data (e.g., levels of Chloride and Strontium concentrations). Likewise, gas flowline data may also include material and design specification for various pipe components that form gas flowlines, such as pipe component geometry and pipe component compositions. The flowline corrosion manager may also collect various gas production parameters regarding gas plant operations, gas well operations, and remote header information regarding the gathering system coupled to the gas wells.

In some embodiments, a flowline corrosion manager includes functionality for determining and/or implementing one or more remediation operations based on integrity assessments, internal corrosion assessment data, and/or external corrosion assessment data. A remediation operation may include replacing a particular pipe component that is part of a gas flowline based on the pipe component failing to satisfy a predetermined criterion (e.g., pipe thickness falling below an integrity threshold). Likewise, a remediation operation may also include adjusting gas production operations to manage corrosion levels in the corresponding pipe component. Likewise, a remediation operation may also include applying one or more corrosion inhibitors to a particular pipe component to prevent future corrosion. In some embodiments, a flowline corrosion manager may automatically prioritize various remediation procedures among different pipe components instantaneously based on desired gas production targets, future plant operations, and/or the corrosion states of various gas flowlines.

In some embodiments, a user device (e.g., user device M (130)) may communicate with the flowline corrosion manager to present integrity assessment reports to a particular user. Based on the integrity assessment reports, a user device may also manage various commands for performing one or more remediation operations based on one or more user selections (e.g., user selections N (131)). The user device may be a personal computer, a handheld computer device such as a smartphone or personal digital assistant, or a human machine interface (HMI). For example, a user may interact with a user interface (e.g., graphical user interface O (132) presented on a display device) to inquire regarding corrosion states and integrity levels in one or more pipe components at a gas plant. Through user selections or automation, the flowline corrosion manager may identify pipe components that fail integrity criteria and implement remediation operations accordingly. As such, a flowline corrosion manager may provide agility and flexibility in determining the corrosion states of various gas flowlines as well as implement remediation operations to prevent or alleviate future corrosion to various gas flowlines.

In some embodiments, an integrity assessment of one or more pipe components is generated by the flowline corrosion manager (150) upon obtaining a request (e.g., request for integrity assessment report P (133)) from a user device and using various predetermined criteria (e.g., integrity criteria D (154)) and input data (e.g., gas flowline data A (151), internal corrosion assessment data B (152), external corrosion assessment data C (153)). The request may be a network message transmitted between a user device and a flowline corrosion manager that identifies a particular pipe component, gas production system, or portion of a gas production network for a corrosion analysis. In some embodiments, the flowline corrosion manager includes functionality for transmitting commands (e.g., command Y (195)) to one or more control systems to implement a particular remediation operation. For example, the flowline corrosion manager X (150) may transmit a network message over a machine-to-machine protocol to a control system in gas plant N (175) or one or more of control systems C (173) in gas plant B (170). A command may be transmitted periodically, based on a user input, or automatically based on changes in gas flowline data.

Returning to FIG. 1, a flowline corrosion manager (e.g., a flowline corrosion manager X (150)) may include hardware and/or software with functionality for generating and/or updating one or more machine-learning models (e.g., machine-learning models E (155)) to determine predicted internal corrosion assessment data, predicted external corrosion assessment data, and/or predicted integrity assessment (e.g., by classifying a pipe component as passing or failing one or more integrity criteria). Examples of machine-learning models may include random forest models and artificial neural networks, such as convolutional neural networks, deep neural networks, and recurrent neural networks. Machine-learning models may also include support vector machines, decision trees, inductive learning models, deductive learning models, supervised learning models, unsupervised learning models, reinforcement learning models, etc. In a deep neural network, for example, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network. In some embodiments, two or more different types of machine-learning models are integrated into a single machine-learning architecture, e.g., a machine-learning model may include K-nearest neighbor (k-NN) models and neural networks. In some embodiments, a reservoir simulator may generate augmented data or synthetic data to produce a large amount of interpreted data for training a particular model.

In some embodiments, various types of machine-learning algorithms (e.g., machine-learning algorithm F (156)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined criterion, such as predetermined level of prediction accuracy or training over a specific number of machine-learning epochs or iterations. Thus, better training of a model may lead to better predictions by a trained model.

With respect to support vector machines, a support vector machines may be a machine-learning model that is trained using a supervised machine-learning algorithm. For example, a support vector machine may provide a data analysis on various input features that implement a classification and regression analysis. More specifically, a support vector machine may determine a hyperplane that separates a dataset into different classes, and also determines various points (i.e., support vectors) that lie closest to different classes. Additionally, a support vector machine may use one or more kernel functions to transform data into a desired form for further processing. The term "Kernel" may refer to a set of mathematical functions that provide the window to manipulate the input data. In other words, a kernel function may transform a training set of data so that a non-linear decision surface is able to transform to a linear equation into a higher number of dimension spaces. Examples of kernel functions may include gaussian kernel functions, gaussian kernel radial basis functions (RBFs), sigmoid kernel functions, polynomial kernel functions, and linear kernel functions.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of temperature values or flow rate values), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a reservoir simulator uses one or more ensemble learning methods to produce a hybrid-model architecture. For example, an ensemble learning method may use multiple types of machine-learning models to obtain better predictive performance than available with a single machine-learning model. In some embodiments, for example, an ensemble architecture may combine multiple base models to produce a single machine-learning model.

One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Turning to random forests, a random forest model may combine the output of multiple decision trees to reach a single predicted result. For example, a random forest algorithm is made up of a collection of decision trees, where training of the random forest model determines three main hyperparameters that include node size, the number of decision trees, and the number of input features being sampled. During training, a random forest model may allow different decision trees to randomly sample from a dataset with replacement (e.g., from a bootstrap sample) to produce multiple final decision trees in the trained model. For example, when multiple decision trees form an ensemble in the random forest model, this ensemble may determine more accurate predicted data, particularly when the individual trees are uncorrelated with each other. In some embodiments, a random forest model implements a software algorithm that is an extension of a bagging method. As, a random forest model may use both bagging and feature randomness to create an uncorrelated forest of decision trees. Feature randomness (also referred to as "feature bagging") may generate a random subset of input features. This random subject may thereby result in low correlation among decision trees in the random forest model. In a training operation for a random forest model, a training operation may search for decision trees that provide the best split to subset particular data, such as through a Classification and Regression Tree (CART) algorithm. Different metrics, such as information gain or mean square error (MSE), may be used to determine the quality of a data split.

Keeping with random forests, a random forest model may be a classifier that uses data having discrete labels or classes. Likewise, a random forest model may also be used as a random forest regressor to solve regression problems. Depending on the type of problem being addressed by the random forest model, how predicted data is determined may vary accordingly. For a regression task, the individual decision trees may be averaged in a predicted result. For a classification task, a majority vote (e.g., the most frequent categorical variable) may determine a predicted class. In a random forest regressor, the model may work with data having a numeric or continuous output, which cannot be defined by distinct classes.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
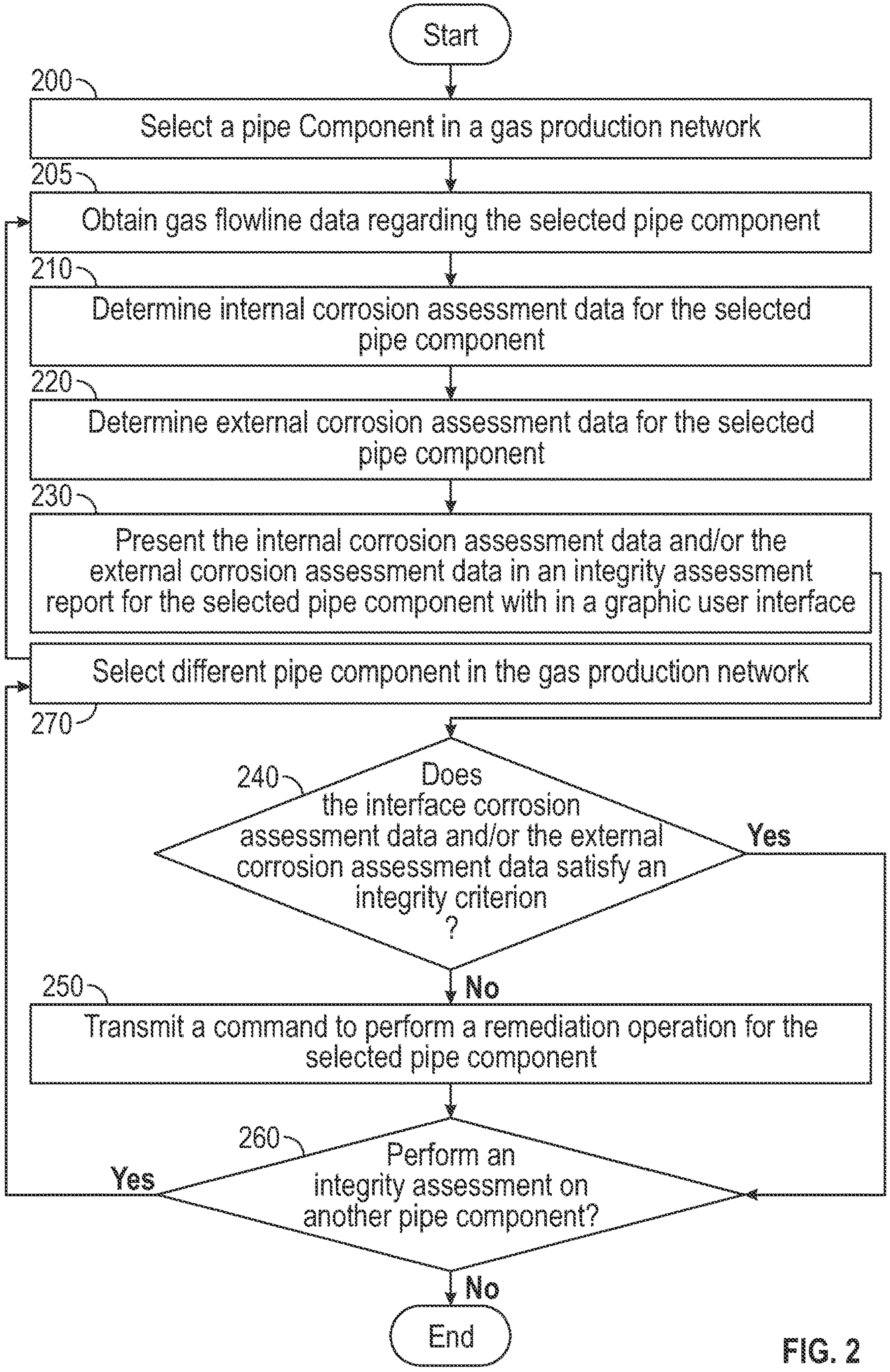
FIG. 2 shows a flowchart in accordance with one or more embodiments.

Turning to FIG. 2, FIG. 2 shows a flowchart in accordance with one or more embodiments. Specifically, FIG. 2 describes a general method for performing integrity assessments of pipe components and/or implementing remediation operations on the pipe components in accordance with one or more embodiments. One or more blocks in FIG. 2 may be performed by one or more components (e.g., flowline corrosion manager X (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 3A:
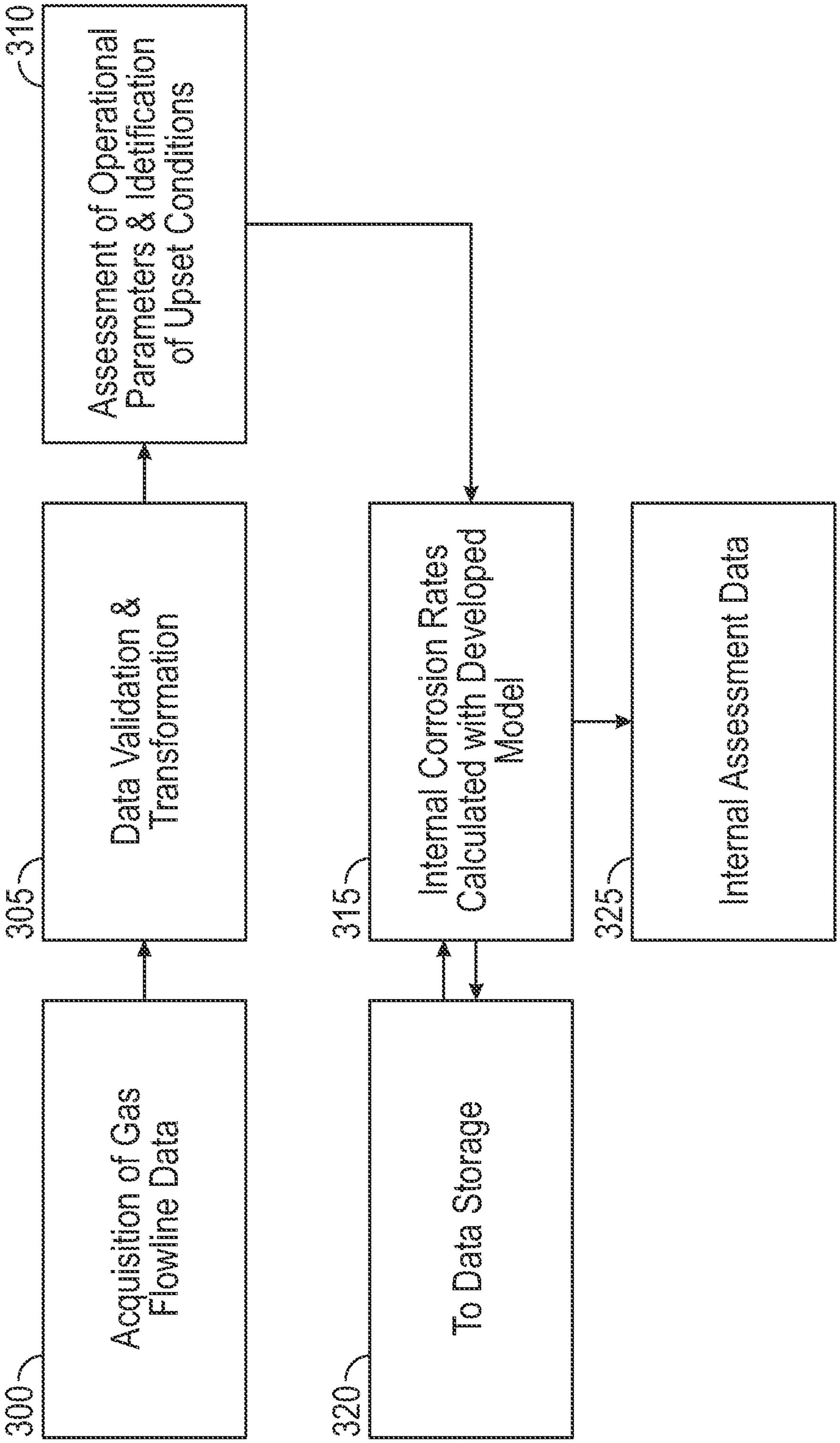
FIGS. 3A, 3B, 3C, and 4 show examples in accordance with one or more embodiments.
Figure 3B:
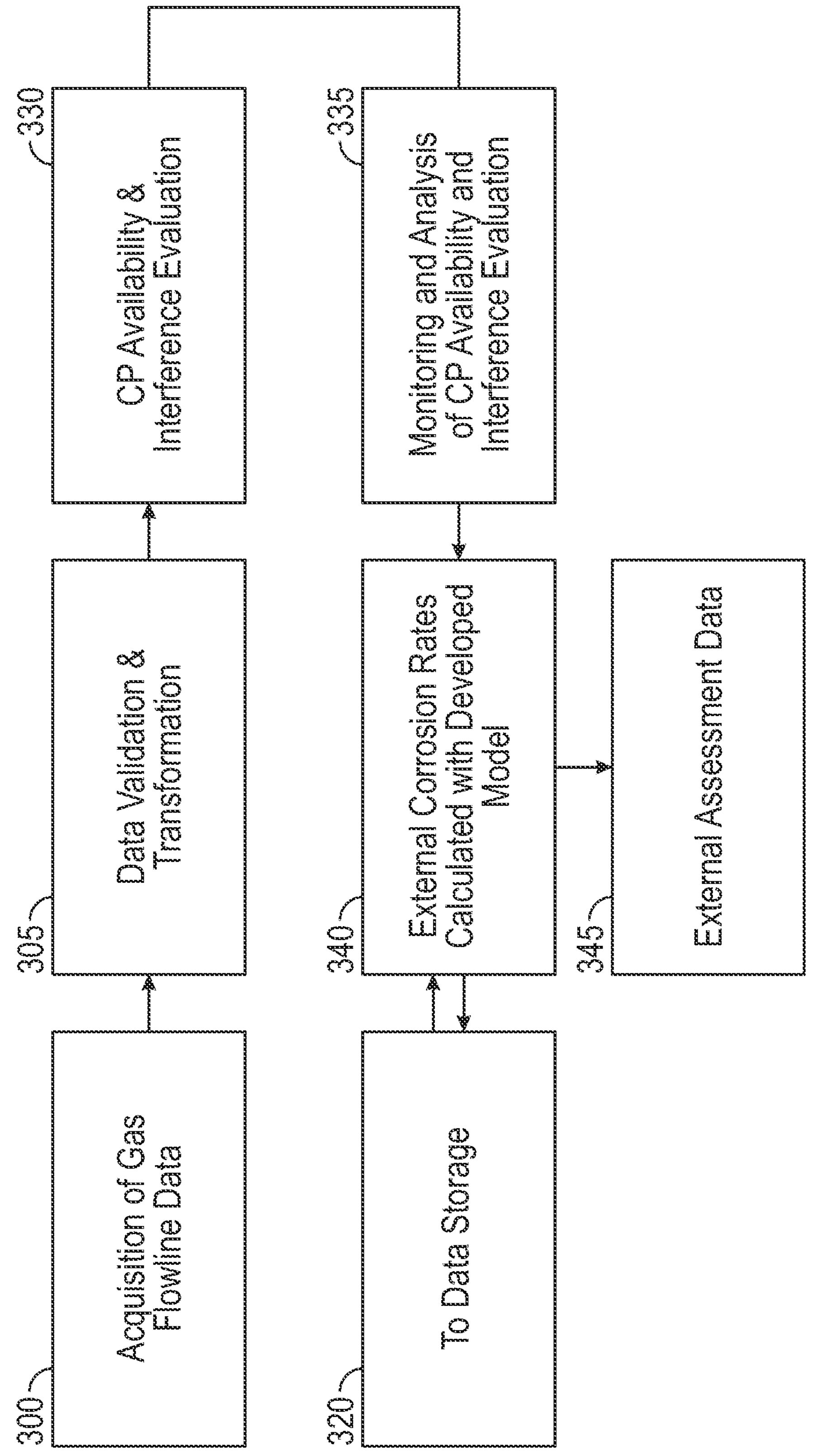
Figure 3C:
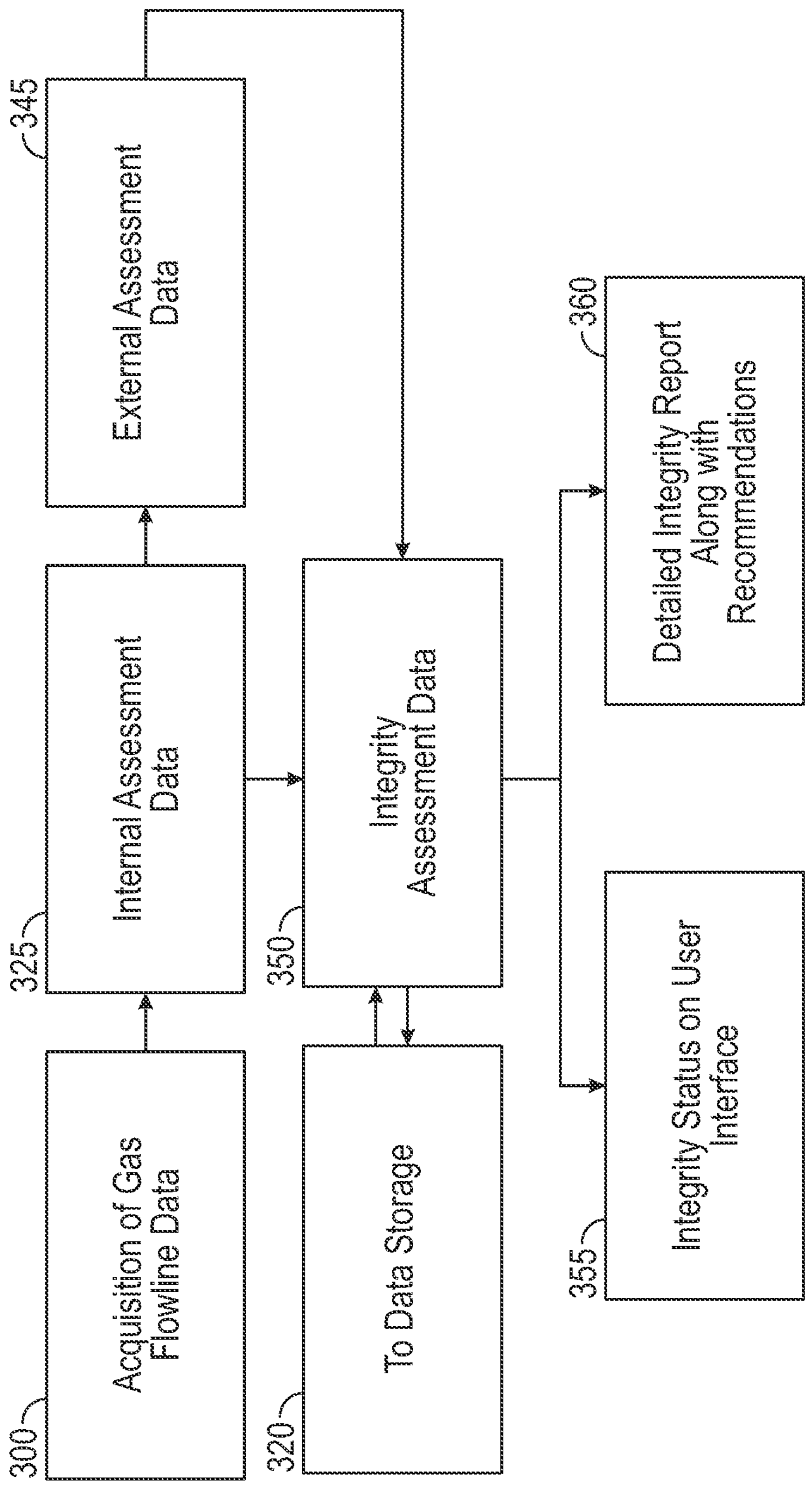

Further, FIGS. 3A-3C show flow diagrams corresponding to internal assessment data, an external assessment data, and a total integrity assessment of operating conditions of the gas flowlines. FIGS. 3A-3C are discusses throughout the description of the process of FIG. 2, as applicable.

Initially, in Block 200, a pipe component is selected in a gas production network in accordance with one or more embodiments. For example, a flowline corrosion manager may systematically analyze various pipe components throughout a gas production network. Likewise, one or more pipe components may be selected for an integrity assessment as part of a request from a user device.

In Block 205, gas flowline data are obtained regarding a selected pipe component in accordance with one or more embodiments. For example, as shown in the flow diagram of FIG. 3A, a flowline corrosion manager (e.g., 150) may collect various types of gas flowline data (300) such as operating sensor data, cathodic protection (CP) status updates, and corrosion inhibitor compliance data from a plant information (PI) server (300). Operating sensor data may include temperature, pressure, status of line, produced water quantity, and flow rate. Gas flowline data (300) are then validated by performing data evaluation and transformation steps with the help of developed algorithms (305).

In Block 210, internal corrosion assessment data are determined for a selected pipe component in accordance with one or more embodiments. Internal corrosion assessment data includes an internal report identifying internal corrosion presence in a gas production network. As shown in FIG. 3A, after validation and transformation, gas flowline data is assessed to identify operational upset conditions and correlation with pre-defined corrosion causing data (310). A person of ordinary skill in the art may appreciate that corrosion causing data may include known historical data shown to cause corrosion in flowlines. Further, in one or more embodiments, operational upset conditions are considered based on inspection data and operational history of gas flowlines. Operational upset conditions may include any condition or error that causes typical operation of the gas flow lines to be disrupted or may cause operations to cease. Main operational upset conditions include stagnation, corrosion inhibitor availability, and intermittent operation. Stagnation occurs when a flowline is pressurized with no flow detection. Corrosion inhibitor availability occurs when a flowline is in operation with little to no corrosion inhibitor injection. Intermittent operation occurs when a flowline is subjected to on/off operations. In FIG. 3A, 310 identifies these upset conditions as they may exist for each gas flowline.

In some embodiments, internal corrosion severity varies for each upset condition as well as for process stream chemistry. For example, if the selected pipe component is experiencing operational upset conditions, internal corrosion rates are calculated using pre-defined corrosion causing data and a developed model, such as a machine-learning model (315). As shown in FIG. 3A, the calculated corrosion rates may be stored in a data storage and considered for additional operational upset conditions (320). Internal assessment data is determined using the calculated corrosion rates (325).

In some embodiments, internal corrosion assessment data are predicted using a machine-learning model. For example, the machine-learning model may be a neural network or random forest model. The machine-learning model may be utilized to perform the transformation of corrosion causing logics to corrosion rates (315).

Continuing with FIG. 2, in Block 220, external corrosion assessment data are determined for a selected pipe component in accordance with one or more embodiments. External corrosion assessment data includes an external report identifying external corrosion presence in a gas production network. As shown in FIG. 3B, after validation and transformation, current and historical cathodic protection system availability is identified and evaluated for interference (330). For example, a cathodic protection system in a nearby pipe component is identified as a possible interfering system. Cathodic protection system availability and interference evaluation is analyzed and monitored with respect to set values of cathodic protection to avoid under or over use of cathodic protection (335). A person of ordinary skill in the art will appreciate that cathodic protection system availability and interference evaluation may be compared with external corrosion causing scenarios. External corrosion rates are calculated using data from cathodic protection system availability and interference evaluation and a developed model, such as a machine-learning model (340). The corrosion rates may be stored in a data storage (320), which may be any suitable persistent or non-persistent storage. External assessment data is determined using the calculated external corrosion rates (345).

In some embodiments, external corrosion assessment data are predicted using a machine-learning model. For example, a flowline corrosion manager may include the machine-learning model. The machine-learning model may be a neural network. The machine-learning model may be utilized to perform the external corrosion rates calculation (345).

In Block 230, internal corrosion assessment data and/or external corrosion assessment data are presented in an integrity assessment report for a selected pipe component within a graphical user interface in accordance with one or more embodiments. As shown in FIG. 3C, integrity assessment data are determined by evaluating internal corrosion assessment data and external assessment data with respect to set acceptable limits (350). The integrity assessment data may be stored in a data storage (320) and used for further evaluation of integrity assessment data. For example, an integrity assessment report includes an integrity status displayed on a user interface (355) and recommendations (360) for mitigating or correcting the operating upset conditions experienced by the gas flowlines.

In some embodiments, integrity assessment data presented in the integrity report (360) are predicted using a machine-learning model such as a neural network.

In Block 240, a determination is made whether internal corrosion assessment data and/or external corrosion assessment data satisfy an integrity criterion in accordance with one or more embodiments. In some embodiments, the integrity criterion includes a predetermined threshold for cracks, dents, and deformations in pipe components based on severity. The integrity criterion may include a predetermined limit for flow change in pipe components.

In Block 250, a command is transmitted to perform a remediation operation for a selected pipe component in accordance with one or more embodiments. The command is transmitted in response to the internal corrosion assessment data and external corrosion assessment data failing to satisfy the integrity criterion. In one or more embodiments, the remediation operation includes a procedure to adjust a gas production network to mitigate internal corrosion and minimize external corrosion.

In Block 260, a determination is made whether to perform an integrity assessment on another pipe component in accordance with one or more embodiments.

In Block 270, a different pipe component is selected in a gas production network in accordance with one or more embodiments.

Figure 4:
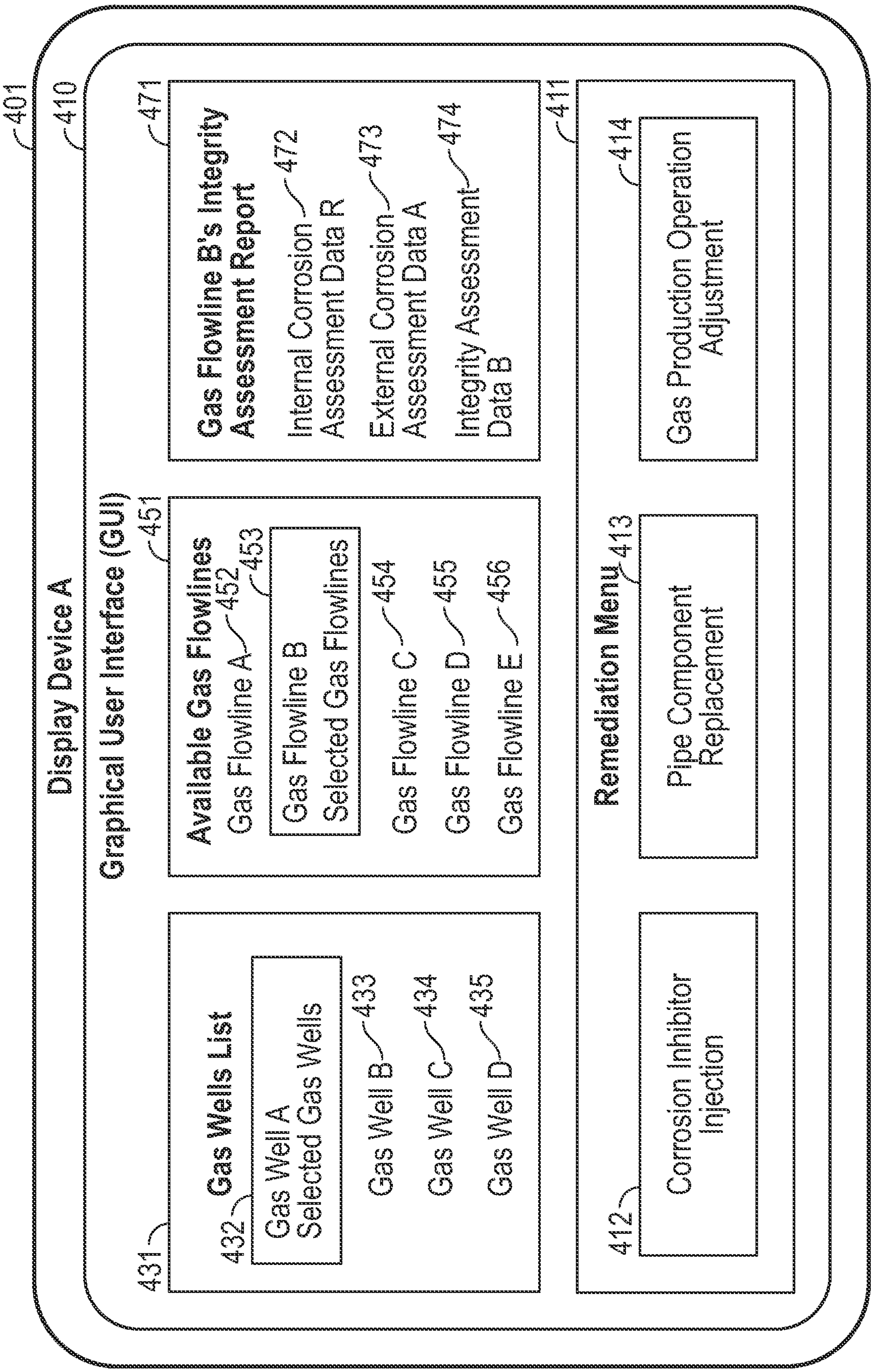

Turning to FIG. 4, FIG. 4 illustrates an example graphical user interface (GUI) for displaying and managing various gas wells and available gas flowlines, in accordance with one or more embodiments. The GUI (410) may be provided by a flow corrosion manager using a display device A (401) of a user device (not shown). Here, the GUI (410) may provide information regarding various gas wells (i.e., a gas wells list (431) that includes a gas well A (432), a gas well B (433), a gas well C (434), and a gas well D (435)) as well as available gas flowlines (451) based on the gas well selection. For example, a user may select gas well A (432), which subsequently populates the available gas flowlines (451) with various gas flowlines coupled to gas well A (432) (I.e., gas flowline A (452), gas flowline B (453), gas flowline C (454), gas flowline D (455), and gas flowline E (456)). When the user further selects gas flowline B (453), the GUI (410) presents gas flowline B's integrity assessment report (471). With respect to gas flowline B (453), the GUI (410) displays internal corrosion assessment data R (472), external corrosion assessment data A (473), and integrity assessment data B (474).

Keeping with FIG. 4, in some embodiments, a flow corrosion manager provides a remediation menu (411) to a user for determining and implementing one or more remediation scenarios. In particular, the remediation menu (411) may be a GUI window that enables a user to adjust various predetermined criteria for a gas production network to mitigate internal corrosion and minimize external corrosion. For example, a user may use the selection for the corrosion inhibitor injection (412) in the remediation menu (411) to apply one or more corrosion inhibitors to a particular pipe to prevent future corrosion of a gas flowline. Likewise, the user may also use the selection for pipe component replacement (413) to replace a particular pipe component that is part of a gas flowline. In another example, the user may modify gas operating values to manage corrosion levels by using the selection for gas production operation adjustment (414). In particular, the GUI (410) may provide commands to implement a selected remediation scenario.

Figure 5:
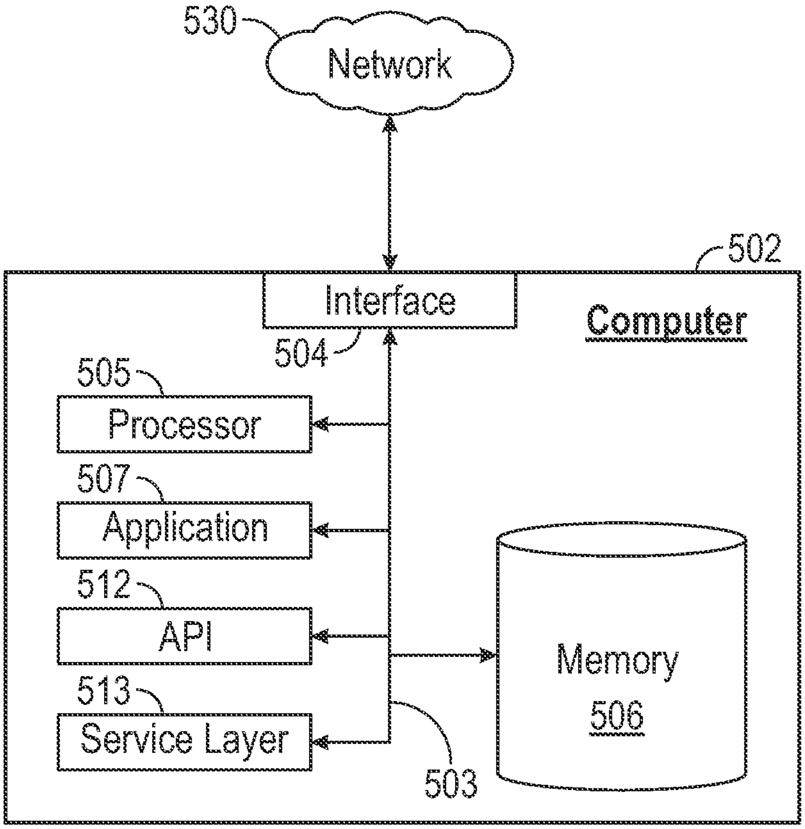
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for a flowline corrosion manager, comprising:

obtaining, by a computer processor, gas flowline data regarding a first pipe component in a gas production network, wherein gas flowline data comprises real-time operating sensor data, cathodic protection status updates, and corrosion inhibitor compliance data over the gas production network, wherein operating sensor data comprises flow rate data and pressure data;

determining, by the computer processor and based on the gas flowline data, whether an operational upset condition exists for the first pipe component, wherein the operational upset condition comprises flow stagnation, corrosion inhibitor unavailability, or intermittent operation;

in response to determining that an operational upset condition exists, determining internal corrosion assessment data for the first pipe component, wherein internal corrosion assessment data comprises an internal report identifying internal corrosion presence in the gas production network;

determining, by the computer processor and based on the gas flowline data, external corrosion assessment data for the first pipe component, wherein external corrosion assessment data comprises an external report identifying external corrosion presence in the gas production network;

determining, by the computer processor, whether the internal corrosion assessment data and the external corrosion assessment data satisfy an integrity criterion for the first pipe component; and transmitting, automatically and in real-time, by the computer processor in response to the internal corrosion assessment data and the external corrosion assessment data failing to satisfy the integrity criterion, a command that implements a remediation operation for the first pipe component, wherein the remediation operation comprises a procedure that adjusts the gas production network to mitigate internal corrosion and minimize external corrosion and at least, in part, address the operational upset condition.

2. The method of claim 1, further comprising:

transmitting, by the computer processor, integrity assessment data in an integrity assessment report to a user device, wherein the user device is coupled to the flowline corrosion manager, and wherein the user device is configured to obtain a user selection within a graphical user interface regarding the remediation operation among a plurality of remediation operations in response to a presentation of the integrity assessment report on a display device.

3. The method of claim 2, further comprising:

predicting the integrity assessment data using a machine-learning model, wherein the flowline corrosion manager comprises the machine-learning model, wherein the machine-learning model is a neural network.

4. The method of claim 1, wherein the flowline corrosion manager comprises the computer processor, wherein the flowline corrosion manager is coupled to a gas plant and a gathering system having a plurality of remote headers configured for controlling streams from a first plurality of gas wells, and wherein the flowline corrosion manager is a gas plant server.

5. The method of claim 1, wherein the integrity criterion comprises a plurality of predetermined thresholds corresponding to cracks, dents, and deformations in the first pipe component, wherein the integrity criterion requires that a change in flow rate in the first pipe component not exceed a predetermined limit, and wherein the predetermined threshold is based on severity.

6. The method of claim 1, further comprising:

predicting the internal corrosion assessment data using a machine-learning model, wherein the flowline corrosion manager comprises the machine-learning model, wherein the machine-learning model is a neural network.

7. The method of claim 1, further comprising:

predicting the external corrosion assessment data using a machine-learning model, wherein the flowline corrosion manager comprises the machine-learning model, wherein the machine-learning model is a neural network.

8. A non-transitory computer-readable medium comprising computer-executable instructions stored thereon that, when executed on a processor, cause the processor to perform:

obtaining gas flowline data regarding a first pipe component in a gas production network, wherein gas flowline data comprises real-time operating sensor data, cathodic protection status updates, and corrosion inhibitor compliance data over the gas production network, wherein operating sensor data comprises flow rate data and pressure data;

determining, based on the gas flowline data, whether an operational upset condition exists for the first pipe component, wherein the operational upset condition comprises flow stagnation, corrosion inhibitor unavailability, or intermittent operation;

in response to determining that an operational upset condition exists, determining internal corrosion assessment data for the first pipe component, wherein internal corrosion assessment data comprises an internal report identifying internal corrosion presence in the gas production network;

determining, based on the gas flowline data, external corrosion assessment data for the first pipe component, wherein external corrosion assessment data comprises an external report identifying external corrosion presence in the gas production network;

determining whether the internal corrosion assessment data and the external corrosion assessment data satisfy an integrity criterion for the first pipe component; and transmitting, automatically and in real-time, in response to the internal corrosion assessment data and the external corrosion assessment data failing to satisfy the integrity criterion, a command that implements a remediation operation for the first pipe component, wherein the remediation operation comprises a procedure that adjusts the gas production network to mitigate internal corrosion and minimize external corrosion and at least, in part, address the operational upset condition.

9. The non-transitory computer-readable medium of claim 8, further comprising:

transmitting integrity assessment data in an integrity assessment report to a user device, wherein the user device is coupled to a flowline corrosion manager, and wherein the user device is configured to obtain a user selection within a graphical user interface regarding the remediation operation among a plurality of remediation operations in response to a presentation of the integrity assessment report on a display device.

10. The non-transitory computer-readable medium of claim 9, wherein the flowline corrosion manager comprises the processor, wherein the flowline corrosion manager is coupled to a gas plant and a gathering system having a plurality of remote headers configured for controlling streams from a first plurality of gas wells, and wherein the flowline corrosion manager is a gas plant server.

11. The non-transitory computer-readable medium of claim 10, wherein the flowline corrosion manager comprises a machine-learning model.

12. The non-transitory computer-readable medium of claim 11, further comprising:

predicting the internal corrosion assessment data using the machine-learning model;

predicting the external corrosion assessment data using the machine-learning model; and predicting the integrity assessment data using the machine-learning model, wherein the machine-learning model is a neural network.

13. The non-transitory computer-readable medium of claim 8, wherein the integrity criterion comprises a plurality of predetermined thresholds corresponding to cracks, dents, and deformations in the first pipe component, wherein the integrity criterion requires that a change in flow rate in the first pipe component not exceed a predetermined limit, and wherein the predetermined threshold is based on severity.

* * * * *